US005547573A

United States Patent [19]

Martin

[11] Patent Number: 5,547,573

[45] Date of Patent: Aug. 20, 1996

[54] DEVICE FOR REMOVING CAKE OR RESIDUAL LAYER IN A CENTRIFUGE

[75] Inventor: Michel Martin, Lyon, France

[73] Assignee: Robatel, Geneve, France

[21] Appl. No.: 321,537

[22] Filed: Oct. 11, 1994

[30] Foreign Application Priority Data

Oct. 13, 1993 [FR] France .................................. 93.12391

[51] Int. Cl.[6] .......................... B01D 33/44; B01D 33/52; B04B 11/04; B04B 15/06

[52] U.S. Cl. .......................... 210/350; 210/351; 210/355; 210/356; 210/369; 210/370; 210/394; 494/36; 494/26; 494/42

[58] Field of Search .................................... 210/350, 351, 210/355, 356, 370, 369, 360.1, 391, 394, 111; 494/36, 42, 25, 26; 55/430, 431, 432, 433

[56] References Cited

U.S. PATENT DOCUMENTS

| | | |
|---|---|---|
| 1,423,021 | 7/1922 | Reynolds . |
| 1,752,758 | 4/1930 | Shimmin . |
| 2,312,999 | 3/1943 | Langen . |
| 2,724,508 | 11/1955 | Luther . |
| 3,017,996 | 1/1962 | Riley . |
| 3,682,310 | 8/1972 | Valdespino . |
| 3,834,535 | 9/1974 | Portyrata . |
| 4,622,144 | 11/1986 | Janecek . |
| 4,714,557 | 12/1987 | Crocket . |
| 4,795,570 | 1/1989 | Young . |
| 4,944,874 | 7/1990 | Kobayashi . |
| 4,997,417 | 3/1991 | Martin . |
| 5,154,825 | 10/1992 | Kupka . |
| 5,163,895 | 11/1992 | Titus . |
| 5,238,566 | 8/1993 | Webb . |

FOREIGN PATENT DOCUMENTS

| | | |
|---|---|---|
| 2105570 | 4/1972 | France . |
| 2289222 | 7/1976 | France . |
| 194863 | 5/1957 | Germany . |
| 1298400 | 7/1962 | Germany . |
| 2108016 | 4/1972 | Germany . |
| 2805032 | 8/1978 | Germany . |
| 3518648 | 11/1986 | Germany . |
| 56-29568 | 7/1981 | Japan . |
| 56-29567 | 7/1981 | Japan . |
| 331822 | 4/1972 | U.S.S.R. . |
| 419259 | 8/1974 | U.S.S.R. . |
| 484882 | 1/1976 | U.S.S.R. . |
| 1465075 | 3/1989 | U.S.S.R. . |
| 1681892 | 10/1991 | U.S.S.R. . |
| 907485 | 10/1962 | United Kingdom . |
| 920447 | 3/1963 | United Kingdom . |

OTHER PUBLICATIONS

Patent Abstracts of Japan–JP60022955; Publication Date: May 2, 1985: Inventor: Tokuma Tatsuo; Others: Title: Vertical Centrifugal Filter.

Patent Abstract of Japan–JP59–95954 (A); Publication Date: Feb. 6, 1984; Inventor: Tatsuo Tokuma; Title: Scraping–Off Device Of Cake In Centrifugal Filter.

*Primary Examiner*—Thomas M. Lithgow
*Attorney, Agent, or Firm*—Dowell & Dowell

[57] ABSTRACT

The device comprises a first wide-mesh cloth or screen which bears against the calender of a basket, at least one tight supple tube connected to a source of gas under pressure which is against the first cloth or screen, a second cloth or screen identical to the first covering the tube such that the tube is sandwiched between the cloths or screens, and a fine-mesh filtering cloth covering the second cloth or screen.

19 Claims, 6 Drawing Sheets

DEVICE FOR REMOVING CAKE OR RESIDUAL LAYER IN A CENTRIFUGE

BACKGROUND OF THE INVENTION

The present invention relates to a device for removing the cake and/or the residual layer retained against the filtering cloth of a basket of a horizontal- or vertical-axis centrifuge after centrifugation of the substance to be treated.

The cake is constituted by the filtered solid of the substance to be treated, while the residual layer is formed by the filtered solid remaining against the filtering cloth after scraping of the cake in order to avoid deterioration of the cloth by the cutting element of the scraper.

The residual layer is generally removed from the centrifuge either because it hinders filtration between two centrifugations of the same product and this by an effect of clogging, or because a change of substance to be treated renders necessary the complete removal of the product previously decanted.

Devices for removing the residual layer when the centrifuge is either in the off position or driven in rotation, are known.

When the centrifuge is in the off position, the residual layer is removed manually with the aid of a special tool. This intervention is dangerous as the operator comes into contact with the product which may include noxious agents. In addition, this technique is long and expensive and risks polluting the decanted product due to the opening of the machine.

When the centrifuge is driven in rotation, different devices exist for removing the residual layer, such as pneumatic or mechanical accessories. When using pneumatic removal accessories, it will be noted that the force of impact of the gas projected under pressure does not suffice to remove the decanted product completely, due to the low density of the gas injected. On the contrary, when using mechanical removal accessories, or scrapers, it is observed that the contact of the plastic element on the filtering cloth wears this latter, causing losses of cloth in the solid, which requires a constant verification thereof.

According to Japanese Patents JP 59 95954 and JP-60 022955, devices under pressure for removing the filtered solid forming the cake, are known.

Japanese Patent JP 59 95954 shows a tight, elastic bag which is placed between the inner wall of the basket and the filtering cloth. The bag comprises a certain number of holes to allow evacuation of the liquid during centrifugation. A gas under pressure is sent inside the bag to displace the filtering cloth in the direction of the axis of rotation of the machine in order to break the residual layer remaining against the filtering cloth after scraping of the cake.

The device presents certain drawbacks concerning the elastic bag which prevents the passage of a large quantity of liquid inside the machine. In fact, the liquid is retained upstream of the filtering cloth due to the presence of the tight bag which reduces the filtration surface, this considerably degrading drying of the solid layer.

Japanese Patent JP 60 022955 shows a filtering cloth with double thickness so as to constitute a bag which deforms under the action of a fluid under pressure. This device cannot function as it is impossible to construct a bag allowing passage of the liquid phase during spinning and then being able to be inflated and remain tight under a high pressure varying between 3 and 6 bars.

SUMMARY OF THE INVENTION

It is a more particular object of the present invention to overcome these drawbacks.

The purpose of the removing device according to the present invention is to allow a perfect evacuation of the liquid contained in the substance to be treated and to break the solid layer obtained after centrifugation under the effect of a thrust.

The device comprises a first wide-mesh cloth or screen fixed against the inner face of the calender of the basket, at least one supple, tight tube connected to a source of pressure and which bears against the first cloth or screen, a second cloth or screen identical to the first, which covers the supple tube so that the latter is sandwiched between the first and second cloth or screen, and a fine-mesh filtering cloth which is fixed against the second cloth or screen.

The supple tube presents the form either of a torus or of a helix, or of a C closed at its ends which is fast with vertical bags regularly spaced over its periphery. The supple tube may also present a square or rectangular section so as to increase the bearing surface against the decanted solid layer.

BRIEF DESCRIPTION OF THE DRAWINGS

The accompanying drawing, given by way of example, will enable the invention, the characteristics that it presents and the advantages that it is capable of procuring, to be more readily understood.

DETAILED DESCRIPTION OF THE PREFERRED EMBODIMENTS

Figure 1:
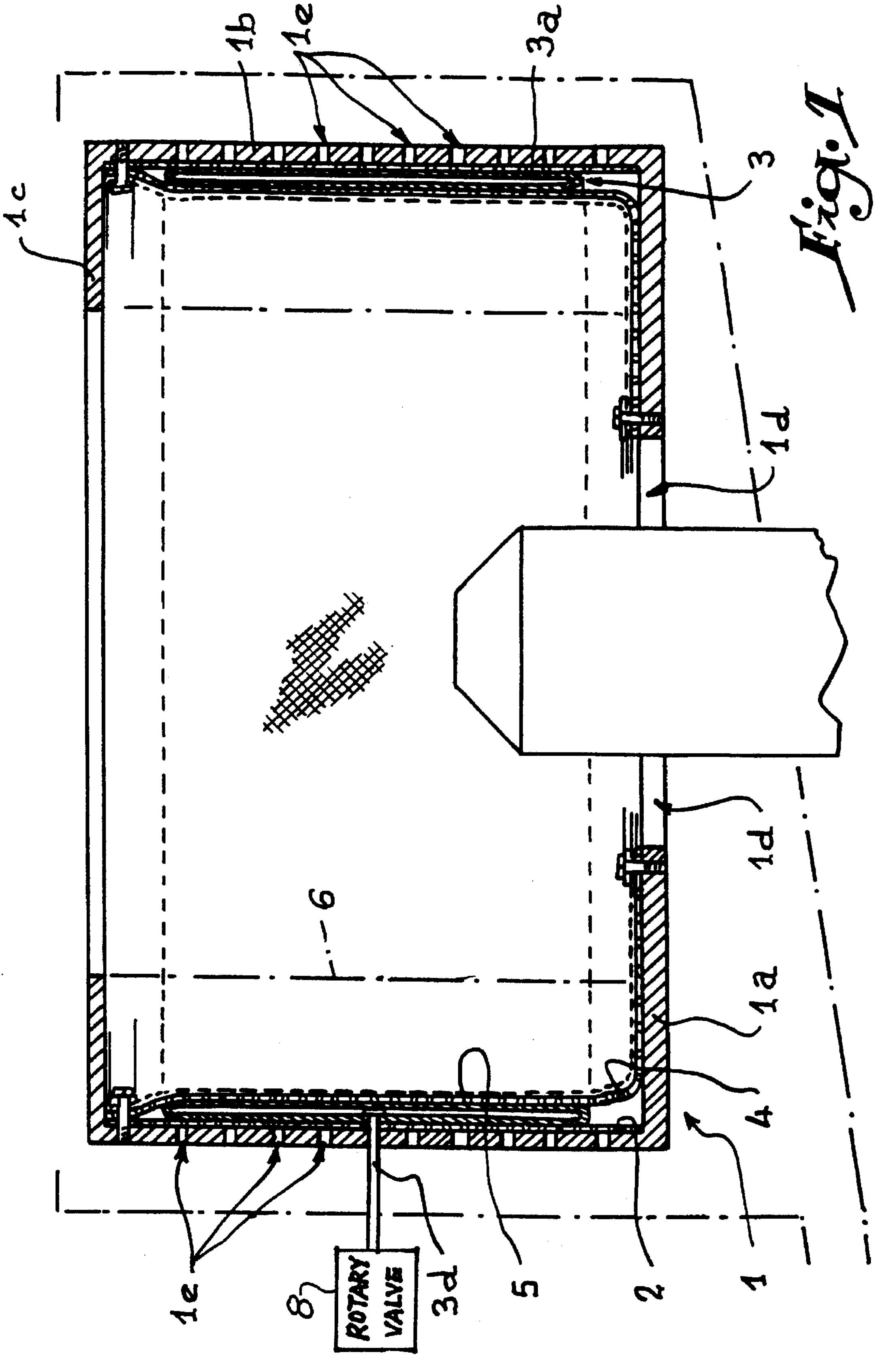
FIG. 1 is a cross-sectional view illustrating the basket of a vertical-axis centrifuge provided with the removal device comprising a tube in the form of a torus in deflated position.

FIGS. 1 to 4 show a basket 1 of a vertical-axis centrifuge known per se. The basket 1 comprises a bottom 1*a* fast with a vertical calender 1*b* of which the upper periphery is bordered by a ring 1*c* parallel to the bottom and oriented in the direction of the middle of the basket.

The bottom 1*a* defines near its center opening holes 1*d* allowing evacuation of the solid product. The calender 1*b* defines in a known manner a multitude of holes 1*e* allowing evacuation of the liquid phase contained in the substance to be treated.

Inside the basket 1 and against the calender 1*b* is placed a first wide-mesh cloth or screen 2. The latter is of a height equivalent to that provided between the bottom 1*a* and the ring 1*c* of the basket 1. On the cloth or screen 2 is placed a removal device 3 constituted by a tight tube 3*a* in the form of a torus which is made of a material such as elastic or deformable plastic.

The removal device 3 is covered with a second cloth or screen 4 identical to the first, but with a larger surface.

The second cloth or screen 4 is covered with another fine-mesh filtering cloth 5 whose surface is equivalent to that of 4.

It will be noted that the cloths 2, 4 and 5 are fixed in the upper part of the calender 1*b* just below the ring 1*c*, while the cloths 4 and 5 are fast with the bottom 1*a* at the level of the holes 1*d*. The wide-mesh cloth 2 is placed solely against the calender 1*b*.

The removal device 3 comprises a supple tube 3*a* in the form of a torus provided with a conduit 3*d* which is connected via a conduit to a source of gas under pressure by means of a rotating valve 8 avoiding stoppage of the centrifuge.

The supple tube 3*a* is placed inside the basket 1 at a certain distance from the calender 1*b* due to the wide-mesh cloth or screen 2. The supple tube 3*a* presents a surface smaller than that of the calender 1*b* when it is in rest position in order to allow circulation of the liquid extracted from the substance to be treated during centrifugation.

In fact, the liquid traverses the fine-mesh cloth 5, then the second wide-mesh cloth or screen 4 to slide on the tube 3*a* to skirt around it at the level of its upper and lower ends with a view to be evacuated via the holes 1*e* made in the calender 1*b* . The first wide-mesh cloth or screen 2 avoids the tube 3*a*, under the effect of the centrifugal force, blocking the holes 1*e* of the calender and allowing free circulation for the liquid with a view to evacuation thereof.

Figure 3:
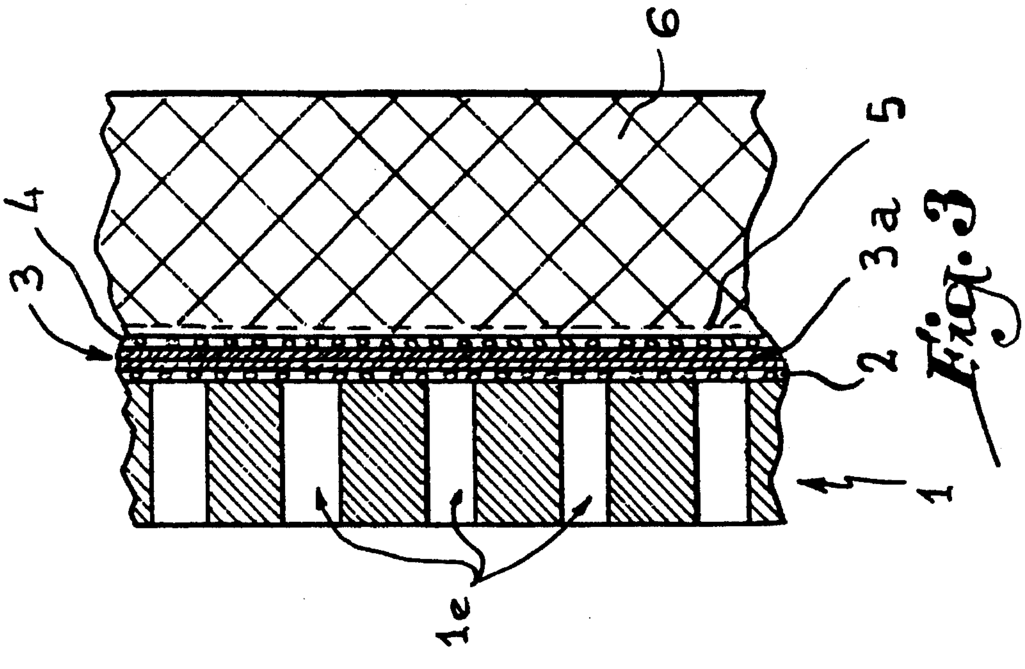
FIG. 3 is an enlarged partial view showing the removal device before it is placed under pressure.

FIG. 3 shows part of the calender 1*b* of the basket 1 on which is retained, after centrifugation, the decanted solid product 6 constituting for example either the cake, or the residual layer. The decanted solid 6 is applied on the filtering cloth 5.

Figure 2:
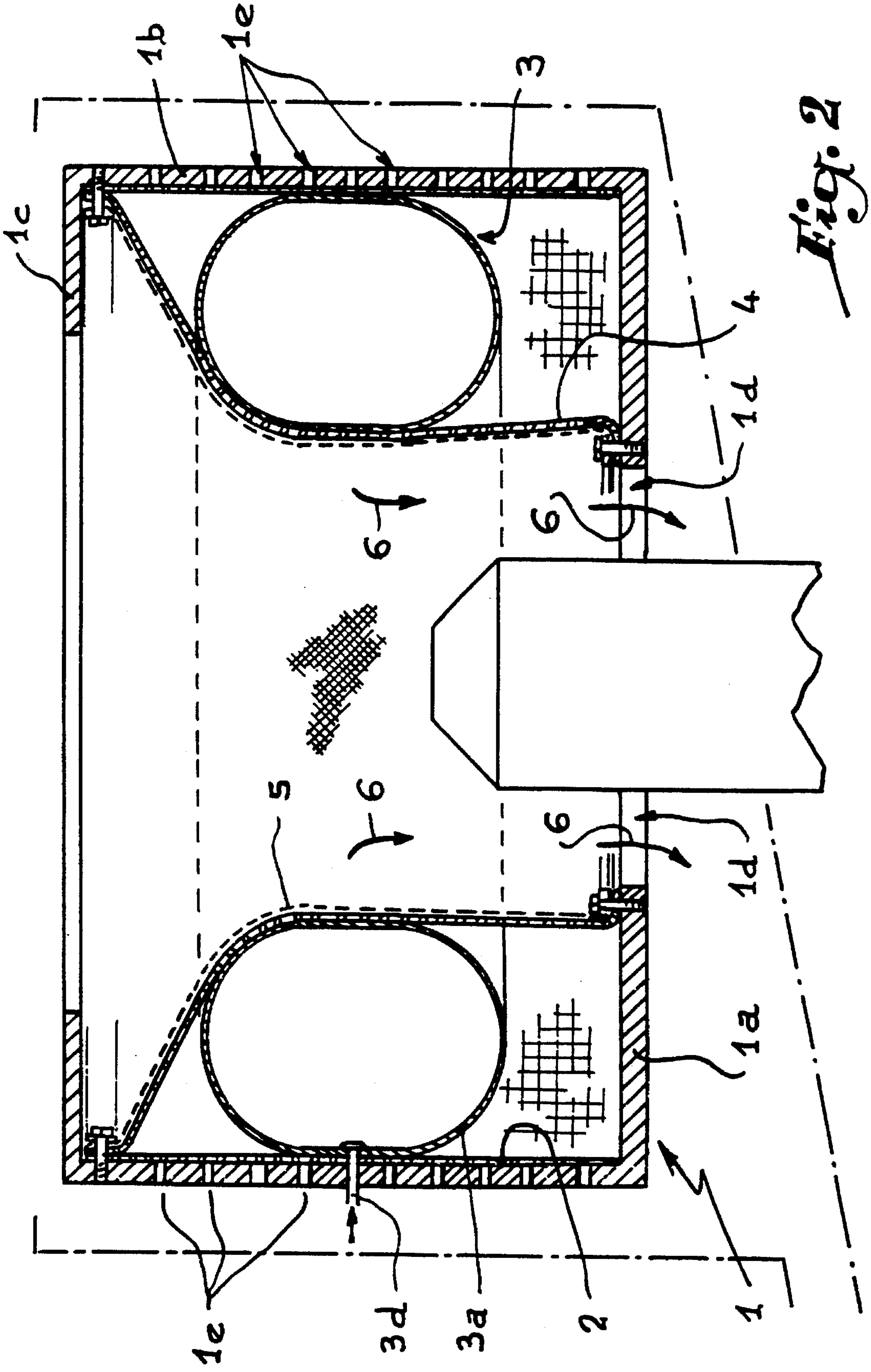
FIG. 2 is a cross-sectional view similar to that of FIG. 1, showing the tight, supple tube under pressure for the displacement of the filtering cloth with a view to breaking the solid layer.
Figure 4:
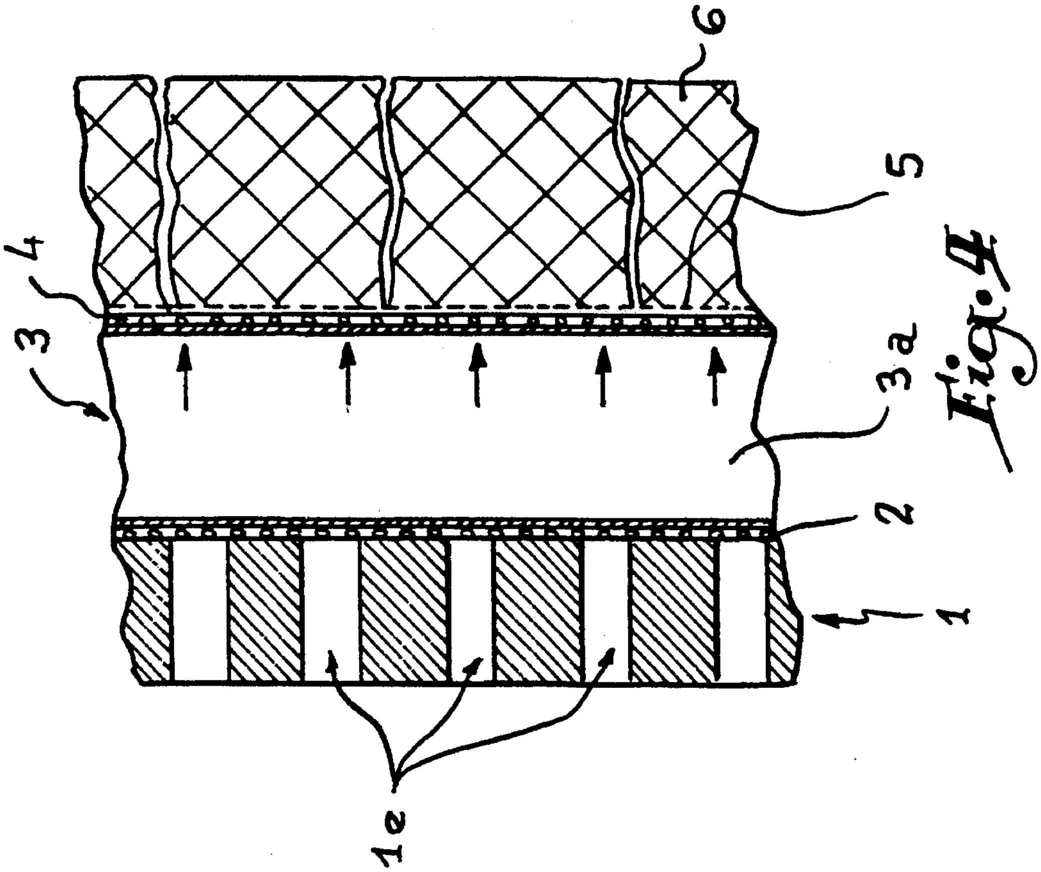
FIG. 4 s a view similar to that of FIG. 3, illustrating the removal device placed under pressure to break the solid layer.

FIG. 4 shows the removal device 3 under pressure, i.e. the tube 3*a* is filled with a gas under pressure, which makes it possible to push the wide-mesh cloth or screen 4 and the filtering cloth 5 towards the center of the basket 1 which is driven in rotation to break into pieces the decanted solid product 6 with a view to eliminating it via holes 1*d* (FIG. 2).

Figure 5:
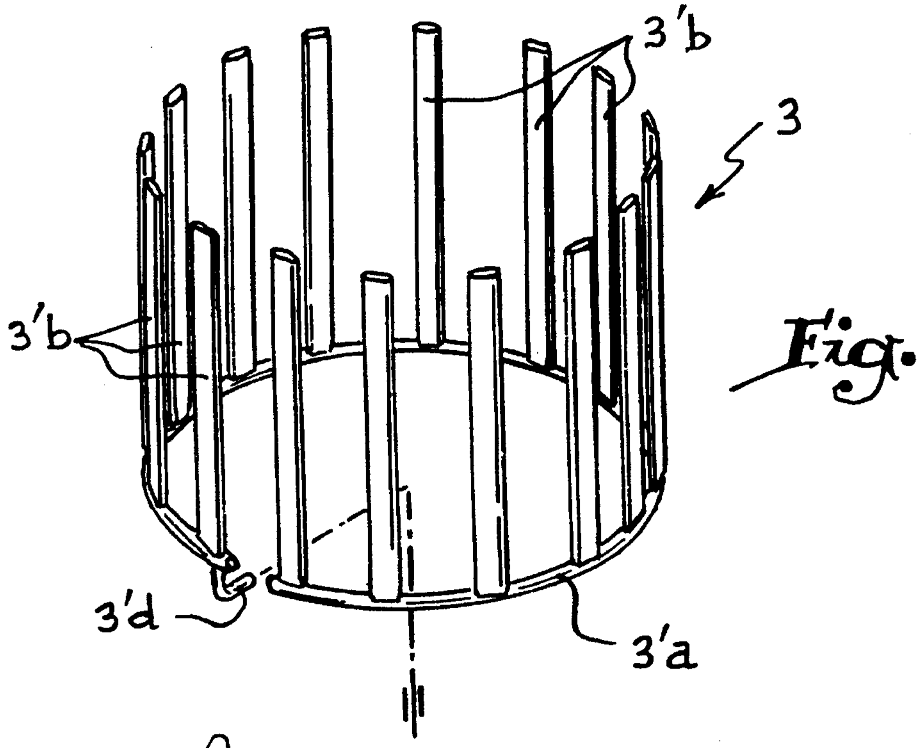
FIG. 5 is a view in perspective illustrating a variant of the tight, supple tube according to the invention.

FIG. 5 shows a first variant of the removal device 3 which comprises a tube 3'*a* placed inside the centrifuge in the vicinity either of the bottom 1*a* or of the ring 1*c* of the calender 1*b*.

The supple tube 3'*a* presents the form of a C closed at its ends and of which the periphery is fast with a plurality of regularly spaced-apart, vertical bags 3'*b*.

The supple tube 3'*a* is placed inside the basket 1 so that the bags 3'*b* extend vertically and parallel to the calender 1*b*. One of the ends of the tube 3'*a* comprises a connection 3'*d* which is connected to a source of pressurized gas by means of a rotating valve (not shown) to function in the same manner as the tube 3*a* shown in FIGS. 3 and 4.

When the device 3 is placed so that the tube 3'*a* is disposed in the vicinity of the ring 1*c* of the calender 1*b*, the operator stops the centrifuge to connect the connection 3'*d* to the pressurized gas supply. In this way, elimination of the decanted solid product is obtained at a stop in the same manner as before (in FIGS. 3 and 4).

It is noted that the supple tube 3'*a* in the form of a C and its vertical bags 3'*b* are between the first cloth or screen 2 and the second cloth or screen 4 in the same way as for the supple tube 3*a*.

Figure 6:
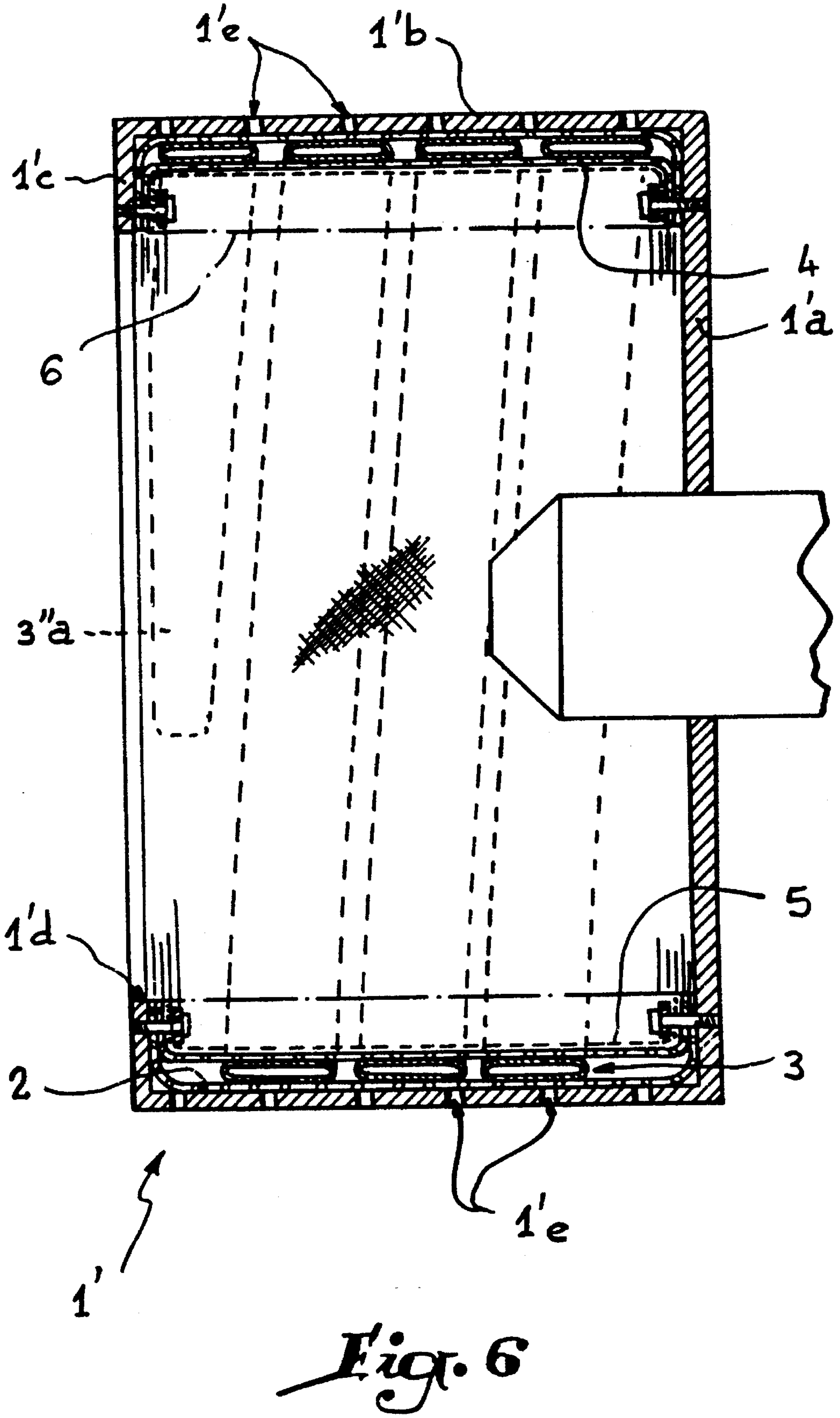
FIGS. 6 and 7 are cross-sectional views representing a variant of the removal device which is intended for the horizontal-axis machines and whose supple, tight tube is disposed helically.
Figure 7:
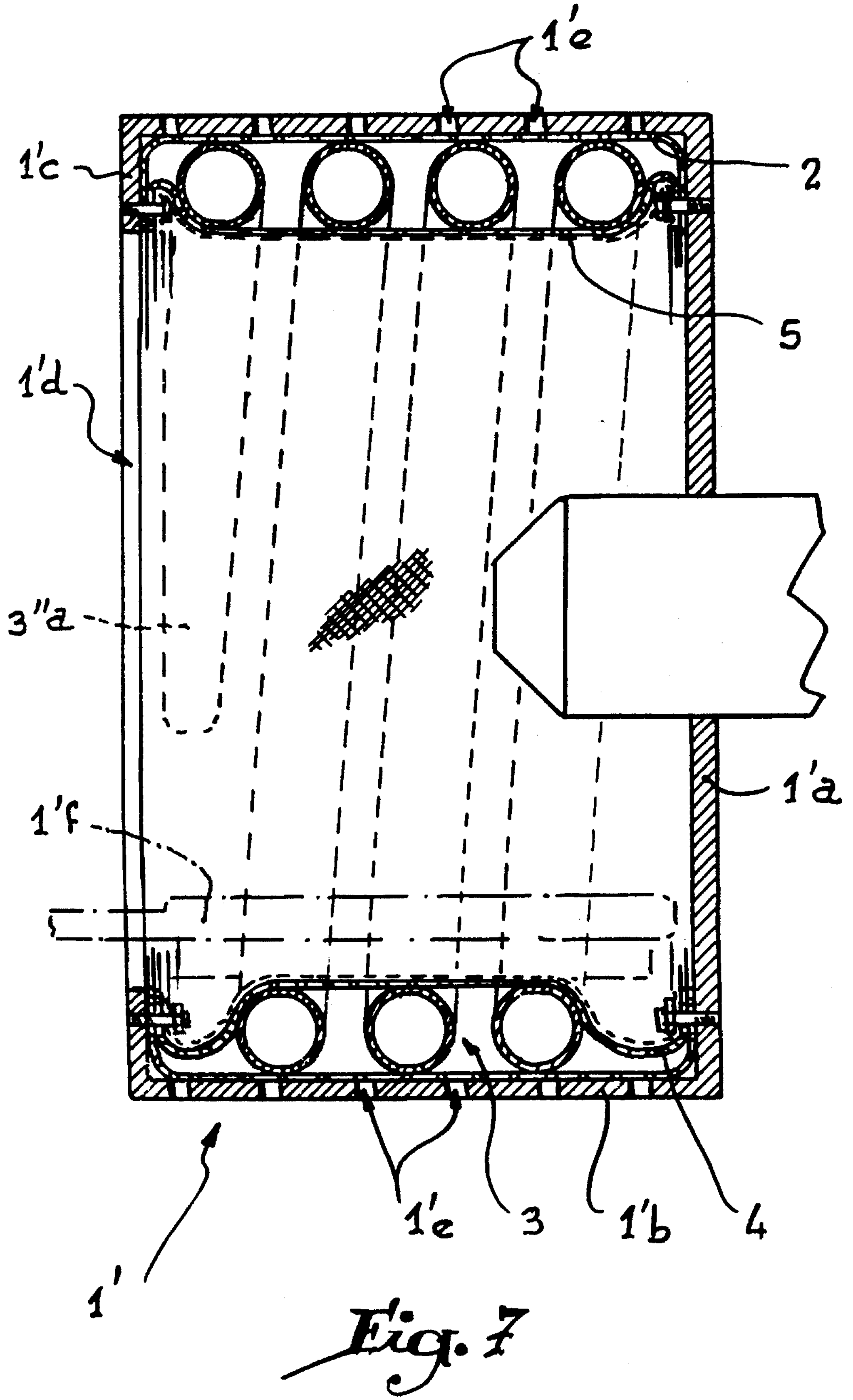

FIGS. 6 and 7 show a second variant of the removal device 3 which is more particularly intended for horizontal-axis centrifuges.

The horizontal-axis centrifuge comprises a basket 1' known per se provided with a bottom 1'*a* placed in a vertical plane, with a horizontal calender 1'*b* whose periphery opposite the bottom 1*a* is bordered by a ring 1'*c* provided with an inner bore 1'*d*. The calender 1'*b* defines in known manner a multitude of holes 1'*e* allowing evacuation of the liquid phase contained in the substance to be treated.

Inside the basket 1' and against the calender 1'*b* is placed the first wide-mesh cloth or screen 2. On cloth 2 is disposed the removal device 3 comprising a supple tube 3"*a* closed at its two free ends. This latter is placed helically, but it may also be disposed in sinusoidal manner.

The supple tube 3"*a* is covered with the second cloth or screen 4 which is itself covered with the fine-mesh filtering cloth 5.

The supple tube 3"*a* is also connected to a source of pressurized gas to break the decanted solid layer 6 as shown in FIGS. 3 and 4.

Cloths 2, 4 and 5 are fixed inside the basket 1' on the bottom 1'*a* and on the ring 1'*c* in order to allow, upon injection of the pressurized gas in the tube 3"*a*, displacement of the cloths 4 and 5 at the level of the inner bore 1'*d* of the ring 1'*c* in order that the solid product 6 may overflow outside the basket 1 when the basket rotates at very low speed (FIG. 7).

A cutter 1'*f* shown in dashed and dotted lines makes it possible, when the centrifuged solid 6 is broken or fragmented, to be directed outside the basket 1' when the basket 1 is driven in rotation.

The cutter 1'*f* is constituted by a supple blade in order not to deteriorate the filtering cloth 5.

Figure 8:
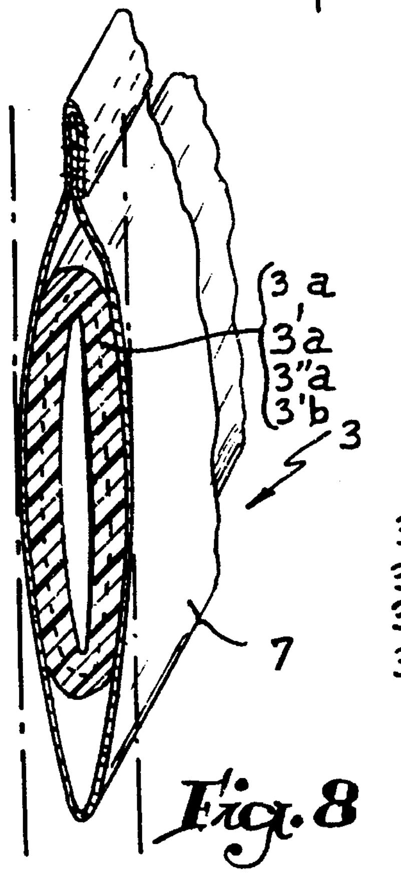
FIGS. 8 and 9 are cross-sectional views showing a tight envelope for protecting the removal device against the chemical products.
Figure 9:
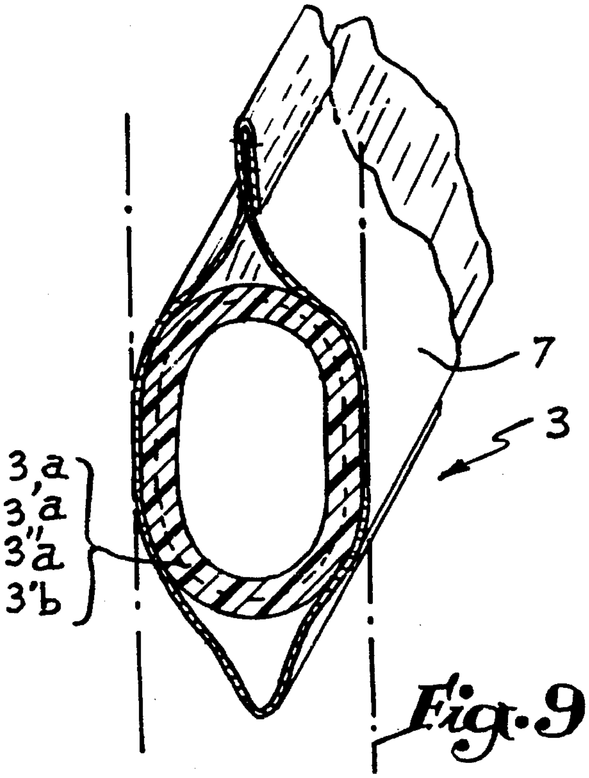

FIGS. 8 and 9 show a tight envelope 7 resistant to the aggressiveness of the chemical products to protect the tubes 3*a*, 3'*a*, 3"*a* or the bags 3'*b*. Tubes 3*a*, 3'*a*, 3"*a* or bags 3'*b* are introduced inside a corresponding envelope 7 made of a reinforced plastic material. The envelope 7 has dimensions greater than those of tubes 3*a*, 3'*a*, 3"*a* and/or bags 3'*b* in order to allow deformation of the latter during injection of a gas under pressure.

I claim:

1. A device for use in a centrifuge comprised of a rotatable basket including a sidewall defining a plurality of fluid passages, comprising:

a first screen including an outer face and an inner face, said first screen being attachable to the basket such that said outer face contacts the sidewall;

a second screen covering said inner face of said first screen;

a third screen covering said second screen, said third screen being of a smaller mesh size than said first and second screens, said second and third screens being attachable to the basket; and a fluid impermeable inflatable element disposed between said first and second screens, said inflatable element being connected to a source of pressurized gas for inflating the element so as to elastically deform said third screen and remove solid material retained thereagainst, said inflatable element being configured to enable fluid flow around said inflatable element and through the fluid passages in the sidewall in a non-inflated condition.

2. The device of claim 1, wherein said inflatable element comprises rotatable means for connecting to the source of pressurized gas to enable inflation during rotation of the basket.

3. The device of claim 1, wherein said inflatable element is toroidally shaped in the inflated condition.

4. The device of claim 1, wherein the inflatable element comprises a C-shaped base portion having closed ends, and a plurality of circumferentially spaced portions extending parallel from said base portion.

5. The device of claim 1, wherein said inflatable element is composed of a plastic material resistant to substances to be centrifuged.

6. The device of claim 1, wherein said inflatable element is enclosed in a chemical resistant containing material.

7. The device of claim 1, wherein said inflatable element is configured to enable fluid flow through a greater number of the fluid passages in the sidewall in an inflated condition than in the non-inflated condition.

8. The device of claim 1, wherein said inflatable element is tubular shaped and closed at opposite ends thereof, and said inflatable element is helically arranged between said first and second screens.

9. The device of claim 2, wherein said inflatable element is tubular shaped and closed at opposite ends thereof, said inflatable element being helically arranged between said first and second screens.

10. A device for use in a centrifuge comprising a rotatable basket including a sidewall defining a plurality of fluid passages, comprising:

a first screen adapted to contact the sidewall of the basket;

a second screen covering said first screen;

a third screen covering an inner face of said second screen, said third screen being of a smaller mesh size than said first and second screens, said first, second and third screens being attachable to the basket of the centrifuge; and a fluid impermeable inflatable element disposed between said first and second screens, said inflatable element comprising rotatable means for connecting to a source of pressurized gas to enable inflation of said inflatable element during rotation of the basket so as to elastically deform said third screen and remove solid material retained thereagainst.

11. The device of claim 10, wherein said inflatable element comprises a C-shaped base portion having closed ends, and a plurality of circumferentially spaced portions extending parallel from said base portion.

12. The device of claim 10, wherein said inflatable element is configured to enable fluid flow around said inflatable element and through a number of fluid passages in the sidewall in a non-inflated condition, and to enable fluid flow through a greater number of the fluid passages in the sidewall in an inflated condition.

13. A centrifuge comprising:

a basket including a sidewall defining a plurality of fluid passages;

means for rotating said basket;

a first screen attached to said basket and including an outer face in contact with said sidewall and an inner face;

a second screen covering said inner face of said first screen;

a third screen covering said second screen, said third screen being of a smaller mesh size than said first and second screens; and a fluid impermeable inflatable element disposed between said first and second screens, said inflatable element being connected to a source of pressurized gas for inflating said inflatable element so as to elastically deform said third screen and remove solid material retained thereagainst, said inflatable element being of a size such that in a non-inflated condition thereof a portion of said sidewall is uncovered by said inflatable element to enable fluid flow around said inflatable element and through said fluid passages.

14. The centrifuge of claim 13, wherein said inflatable element is configured such that in the inflated condition thereof a greater portion of the sidewall of the basket is uncovered by said inflatable element relative to the non-inflated condition to enable fluid flow around said inflatable element and through a greater number of the fluid passages in the sidewall.

15. The centrifuge of claim 13, wherein said inflatable element comprises rotatable means for connecting to the source of pressurized gas to enable inflation during rotation of said basket.

16. The centrifuge of claim 15, comprising a vertical rotational axis, said basket comprises an upper wall in the form of a ring and a lower wall which defines a bore for the passage of solid material removed from said third screen, one end of each of said first, second and third screens being attached to the sidewall of the basket adjacent to said upper wall, and an opposite end of said second and third screens being attached to said lower wall adjacent to said bore.

17. The centrifuge of claim 15, comprising a horizontal rotational axis, said basket comprises a first endwall defining a bore and a second endwall opposite to the first endwall, one end of each of said first, second and third screens being attached to said first endwall adjacent to said bore and an opposite end of said first, second and third screens being attached to said second endwall.

18. The device of claim 13, wherein said inflatable element is composed of a plastic material resistant to substances to be centrifuged.

19. The device of claim 13, wherein said inflatable element is enclosed in a chemical resistant containing material.

* * * * *